United States Patent
Takasu et al.

(10) Patent No.: US 10,420,995 B2
(45) Date of Patent: Sep. 24, 2019

(54) GOLF CLUB SHAFT

(71) Applicant: SUMITOMO RUBBER INDUSTRIES, LTD., Kobe-shi, Hyogo (JP)

(72) Inventors: Kenji Takasu, Kobe (JP); Takashi Nakano, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 16/027,932

(22) Filed: Jul. 5, 2018

(65) Prior Publication Data

US 2019/0009148 A1 Jan. 10, 2019

(30) Foreign Application Priority Data

Jul. 6, 2017 (JP) .................................. 2017-133159

(51) Int. Cl.
| | |
|---|---|
| *A63B 53/10* | (2015.01) |
| *A63B 1/00* | (2006.01) |
| *A63B 53/04* | (2015.01) |
| *A63B 102/32* | (2015.01) |
| *B29L 31/52* | (2006.01) |

(Continued)

(52) U.S. Cl.
CPC ............... *A63B 53/10* (2013.01); *A63B 1/00* (2013.01); *A63B 53/047* (2013.01); *A63B 53/0466* (2013.01); *A63B 2102/32* (2015.10); *A63B 2209/023* (2013.01); *B29C 70/32* (2013.01); *B29C 70/543* (2013.01); *B29C 70/545* (2013.01); *B29K 2063/00* (2013.01); *B29K 2105/0881* (2013.01); *B29K 2307/04* (2013.01); *B29L 2031/5227* (2013.01)

(58) Field of Classification Search
CPC . A63B 53/10; A63B 2102/32; A63B 53/0466; A63B 53/047; A63B 2209/023; B29C 70/32; B29C 70/543; B29C 70/545; B29K 2063/00; B29K 2105/0881; B29K 2307/04
USPC ........................................................ 473/319
See application file for complete search history.

(56) References Cited

U.S. PATENT DOCUMENTS

| | | |
|---|---|---|
| 2009/0069109 A1 | 3/2009 | Kumamoto |
| 2012/0165113 A1 | 6/2012 | Kato |

(Continued)

FOREIGN PATENT DOCUMENTS

| | | |
|---|---|---|
| JP | 2009-66130 A | 4/2009 |
| JP | 2012-130533 A | 7/2012 |

(Continued)

*Primary Examiner* — Michael D Dennis
(74) *Attorney, Agent, or Firm* — Birch, Stewart, Kolasch & Birch, LLP

(57) ABSTRACT

A shaft 6 has a forward flex of equal to or longer than 130 mm and equal to or shorter than 178 mm. When the forward flex is represented by f1, and a backward flex is represented by f2, f2/(f1+f2) is equal to or greater than 0.46 and equal to or less than 0.50. When a distance between a butt end Bt and a center of gravity Gs of the shaft is represented by L (centimeter), and a weight of the shaft is represented by Ws (kilogram), a butt end GLL is calculated by the following formula:

butt end $GLL = Ws \times L \times L$, wherein the butt end GLL ($kg \cdot cm^2$) is equal to or less than 110 $kg \cdot cm^2$.

16 Claims, 5 Drawing Sheets

(51) Int. Cl.
*B29C 70/54* (2006.01)
*B29K 105/08* (2006.01)
*B29K 307/04* (2006.01)
*B29K 63/00* (2006.01)
*B29C 70/32* (2006.01)

(56) References Cited

U.S. PATENT DOCUMENTS

| | | | |
|---|---|---|---|
| 2012/0295730 A1 | 11/2012 | Hasegawa et al. | |
| 2012/0295734 A1* | 11/2012 | Hasegawa | A63B 53/10 |
| | | | 473/319 |
| 2012/0309558 A1 | 12/2012 | Nakano | |
| 2013/0095950 A1* | 4/2013 | Hasegawa | A63B 60/42 |
| | | | 473/318 |
| 2015/0024865 A1 | 1/2015 | Nakamura | |
| 2015/0038254 A1* | 2/2015 | Nakamura | A63B 60/00 |
| | | | 473/319 |
| 2015/0087435 A1 | 3/2015 | Nakamura | |
| 2015/0087436 A1 | 3/2015 | Nakamura | |
| 2015/0224375 A1* | 8/2015 | Yashiki | A63B 60/54 |
| | | | 473/319 |
| 2016/0354647 A1 | 12/2016 | Nakano | |

FOREIGN PATENT DOCUMENTS

| | | |
|---|---|---|
| JP | 2012-239564 A | 12/2012 |
| JP | 2012-245309 A | 12/2012 |
| JP | 5546672 B1 | 7/2014 |
| JP | 5546673 B1 | 7/2014 |
| JP | 5546701 B1 | 7/2014 |
| JP | 2017-266 A | 1/2017 |

* cited by examiner

GOLF CLUB SHAFT

The present application claims priority on Patent Application No. 2017-133159 filed in JAPAN on Jul. 6, 2017, the entire contents of which are hereby incorporated by reference.

BACKGROUND OF THE INVENTION

Field of the Invention

The present invention relates to golf club shafts.

Description of the Related Art

A golf club in which specifications of the shaft are taken into consideration in view of easiness of swing, etc. has been proposed. Each of Japanese Patent No. 5546672 (US2015/0087436), Japanese Patent No. 5546673 (US2015/0087435) and Japanese Patent No. 5546701 (US2015/0024865) discloses a preferable value of a moment of inertia of a shaft about a swing axis when a moment of inertia of the club about the swing axis is set within a predetermined range.

SUMMARY OF THE INVENTION

The inventors of the present application conducted thorough researches for further improvement of golf club shafts. As a result, a new constitution which can enhance easiness of swing has been found.

The present disclosure provides a golf club shaft which is easy to swing.

In one aspect, a forward flex of a shaft is equal to or longer than 130 mm and equal to or shorter than 178 mm. When the forward flex is represented by f1, and a backward flex is represented by f2, then f2/(f1+f2) may be equal to or greater than 0.46 and equal to or less than 0.50. When a distance between a butt end and a center of gravity of the shaft is represented by L (centimeter), and a weight of the shaft is represented by Ws (kilogram), then a butt end GLL (kg·cm$^2$) calculated by the following formula may be equal to or less than 110 kg·cm$^2$.

Butt end $GLL = Ws \times L \times L$.

In another aspect, the butt end GLL may be equal to or greater than 85 kg·cm$^2$.

In another aspect, a shaft length may be equal to or longer than 43 inches and equal to or shorter than 48 inches.

In another aspect, a shaft weight may be equal to or greater than 35 g and equal to or less than 50 g. A shaft torque may be equal to or greater than 6.0 degrees and equal to or less than 7.5 degrees.

The shaft may be constituted by a plurality of layers. The layers may include a first butt partial layer and a second butt partial layer. The first butt partial layer may be a glass fiber reinforced layer. The second butt partial layer may be a hoop layer.

The layers may include a butt partial straight layer and a tip partial straight layer. An overlap region in which the butt partial straight layer and the tip partial straight layer overlap each other in an axial-direction region may be formed.

In another aspect, the butt partial straight layer may have a fiber elastic modulus smaller than a fiber elastic modulus of the tip partial straight layer.

In another aspect, the shaft may further have a partial hoop layer. The partial hoop layer may be disposed in the overlap region.

DESCRIPTION OF THE PREFERRED EMBODIMENTS

The preferred embodiments will be described later in detail with appropriate reference to the drawings.

In the present application, an "axial direction" means an axial direction of a shaft.

Figure 1:
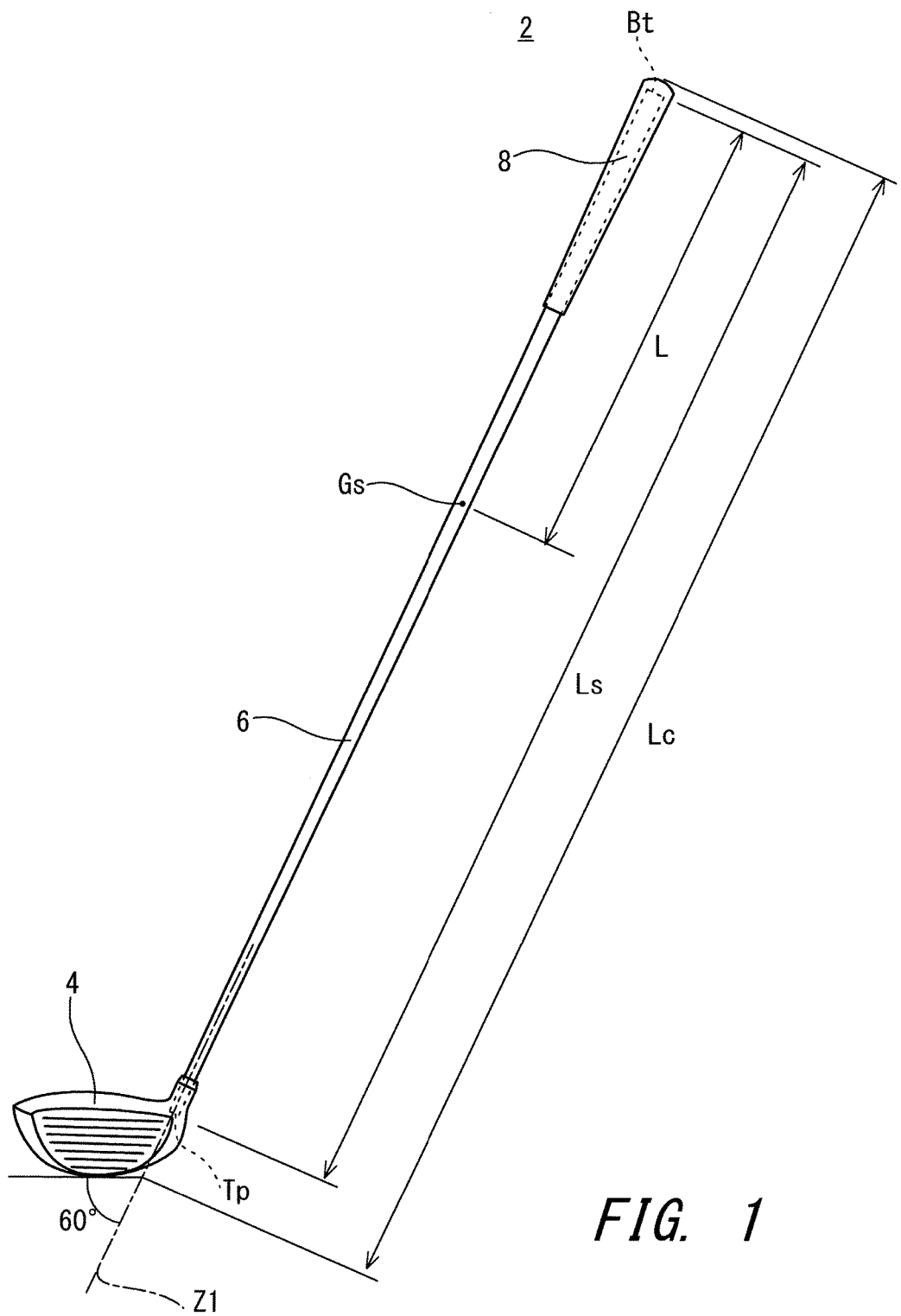
FIG. 1 shows a golf club in which a shaft according to an embodiment is attached.

FIG. 1 shows a golf club 2 including a shaft 6 according to an embodiment. The golf club 2 includes a head 4, the shaft 6, and a grip 8. The head 4 is attached to a tip portion of the shaft 6. The grip 8 is attached to a butt portion of the shaft 6.

The golf club 2 is a driver (number 1 wood). The driver usually has a club length Lc of equal to or longer than 43 inches and equal to or shorter than 47 inches. Preferably, the golf club 2 is a wood-type golf club. The club length Lc is measured based on rules defined by the R&A (Royal and Ancient Golf club of Saint Andrews). The rules are appeared in "1c Length" in "1 Clubs" of "Appendix II Design of Clubs" of the updated Rules of Golf announced by the R&A. As shown in FIG. 1, in the measurement of the club length Lc, the sole is abutted on a plane having an angle of 60 degrees with respect to a horizontal plane. The club length Lc is a distance between a butt end of the club and an intersection line of the 60-degree plane and the horizontal plane.

In the present embodiment, the head 4 has a hollow structure. The head 4 is a wood-type head. The head 4 has a head weight Wh. The head 4 may be a hybrid-type head (utility-type head). The head 4 may be an iron-type head. The head 4 may be a putter-type head.

The head 4 can be manufactured by a known method such as casting, forging, or press forming. In the head 4 having the hollow structure, a plurality of members are welded to each other.

Examples of the material of the head 4 include a metal and a fiber reinforced plastic. Examples of the metal include a titanium alloy, pure titanium, stainless steel, and soft iron. Examples of the fiber reinforced plastic include carbon fiber reinforced plastic.

The grip 8 is a portion grasped by a golf player during swinging. The process for manufacturing the grip 8 is not limited. The grip 8 can be manufactured by a known process. Examples of the manufacturing process include press forming, and injection forming.

The shaft 6 is formed by a laminate of fiber reinforced resin layers. The shaft 6 is a tubular body.

The shaft 6 has a hollow structure. As shown in FIG. 1, the shaft 6 includes a tip end Tp and a butt end Bt. The tip end Tp is located in the head 4. The butt end Bt is located in the grip 8.

The shaft 6 has a shaft weight Ws.

A shaft length is shown by a double-pointed arrow Ls in FIG. 1. The shaft length Ls is an axial-direction distance between the tip end Tp and the butt end Bt. An axial-direction distance between the butt end Bt and a center of gravity Gs of the shaft is shown by a double-pointed arrow L in FIG. 1. The center of gravity Gs of the shaft is a center of gravity of only the shaft 6. The center of gravity Gs is located on an axis line of the shaft.

The shaft 6 is a so-called carbon shaft. Preferably, the shaft 6 is formed by curing a prepreg sheet. In the prepreg sheet, fibers are oriented substantially in one direction. Such a prepreg in which fibers are oriented substantially in one direction is also referred to as a UD prepreg. The term "UD" stands for uni-direction. Prepregs which are not the UD prepreg may be used. For example, fibers contained in the prepreg sheet may be woven.

The prepreg sheet has a fiber and a resin. The resin is also referred to as a matrix resin. Typically, the fiber is a carbon fiber. Typically, the matrix resin is a thermosetting resin.

The shaft 6 is manufactured by a so-called sheet-winding method. In the prepreg, the matrix resin is in a semi-cured state. The shaft 6 is obtained by winding and curing the prepreg sheet.

In addition to an epoxy resin, a thermosetting resin other than the epoxy resin or a thermoplastic resin, etc. can be used for the matrix resin of the prepreg sheet. In light of shaft strength, the matrix resin is preferably the epoxy resin.

A method for manufacturing the shaft 6 is not limited. In light of the degree of freedom of design, a shaft manufactured by a sheet winding method is preferable. The material of the shaft 6 is not limited. The shaft 6 may be a steel shaft, for example.

Figure 2:
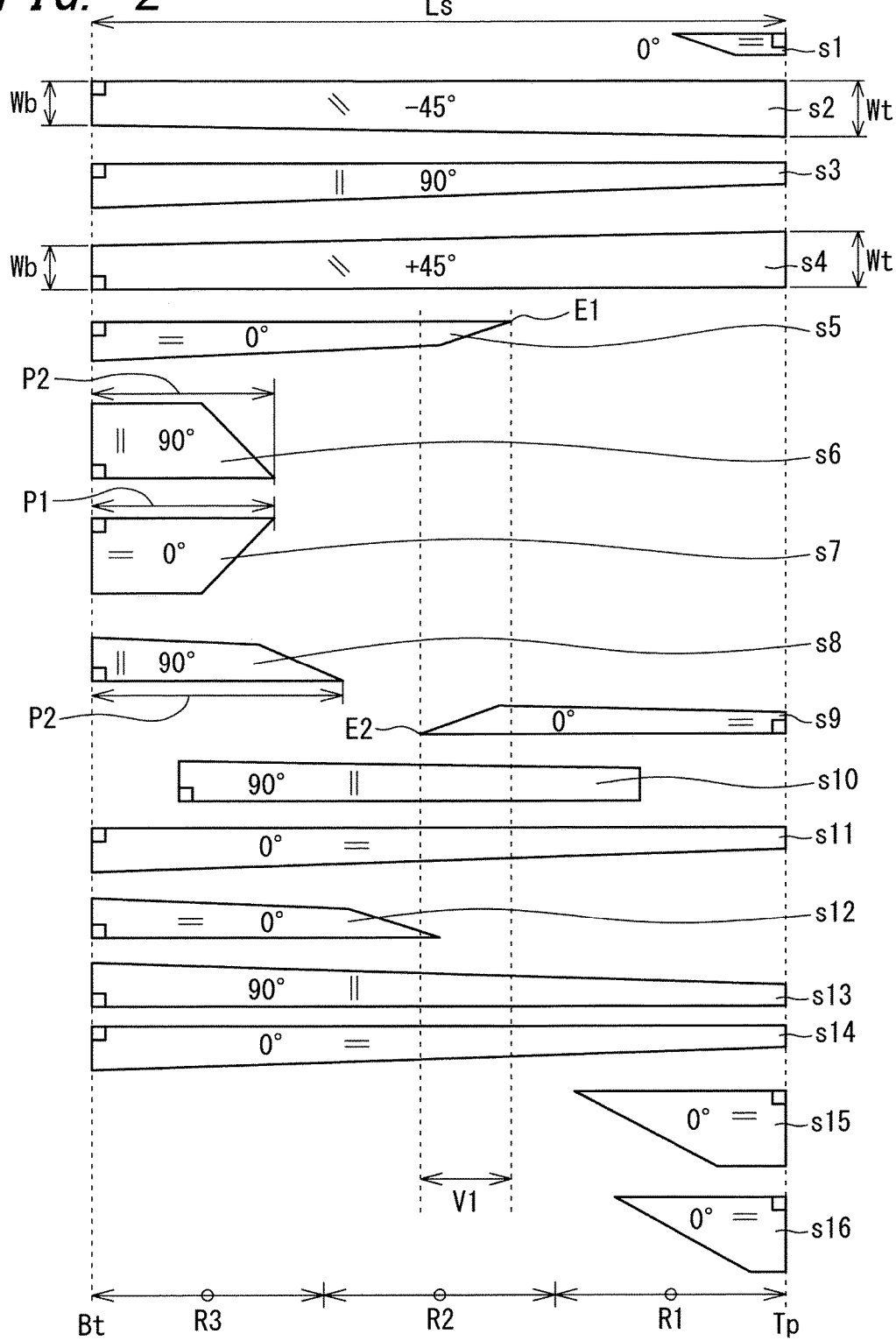
FIG. 2 is a developed view showing a laminated constitution of the shaft in FIG. 1.

FIG. 2 is a developed view (laminated constitution view) of a prepreg sheet constituting the shaft 6.

The shaft 6 is constituted by a plurality of sheets. The shaft 6 is constituted by 16 sheets of a first sheet s1 to a sixteenth sheet s16. The developed view shows the sheets constituting the shaft in order from the radial inside of the shaft. The sheets are wound in order from the sheet located on the uppermost side in the developed view. In the developed view, the horizontal direction of the figure coincides with the axial direction of the shaft. In the developed view, the right side of the figure is the tip end Tp side of the shaft. In the developed view, the left side of the figure is the butt end Bt side of the shaft.

The developed view shows not only the winding order of the sheets but also the disposal of each of the sheets in the axial direction of the shaft. For example, in FIG. 2, an end of the first sheet s1 is located at the tip end Tp. For example, in FIG. 2, an end of the sixth sheet s6 is located at the butt end Bt.

The term "layer" and the term "sheet" are used in the present application. The "layer" is a term for after being wound. Meanwhile, the "sheet" is a term for before being wound. The "layer" is formed by winding the "sheet". That is, the wound "sheet" forms the "layer". In the present application, the same symbol is used in the layer and the sheet. For example, a layer formed by a sheet s1 is a layer s1.

The shaft 6 includes a straight layer, a bias layer, and a hoop layer. An orientation angle Af of the fiber is described for each of the sheets in the developed view of the present application. The orientation angle Af is an angle with respect to the axial direction of the shaft.

The shaft 6 includes two bias layers. Three or more bias layers may be provided. The shaft 6 includes two or more straight layers.

A sheet described as "0°" forms the straight layer. The sheet forming the straight layer is also referred to as a straight sheet.

The straight layer is a layer in which the angle Af is substantially set to 0 degree. Usually, the angle Af is not completely set to 0 degree due to error or the like in winding.

Usually, in the straight layer, an absolute angle θa is equal to or less than 10 degrees. The absolute angle θa is an absolute value of the orientation angle Af. For example, "the absolute angle θa is equal to or less than 10 degrees" means that "the angle Af is −10 degrees or greater and +10 degrees or less".

In the embodiment of FIG. 2, the straight sheets are the sheet s1, the sheet s5, the sheet s7, the sheet s9, the sheet s11, the sheet s12, the sheet s14, the sheet 15, and the sheet s16.

The bias layer is highly correlated with the torsional rigidity and torsional strength of the shaft. Preferably, a bias sheet includes two sheets in which orientation angles of fibers of the respective sheets are inclined in opposite directions to each other. In light of the torsional rigidity, the absolute angle θa of the bias layer is preferably equal to or greater than 15 degrees, more preferably equal to or greater than 25 degrees, and still more preferably equal to or greater than 40 degrees. In light of the torsional rigidity and flexural rigidity, the absolute angle θa of the bias layer is preferably equal to or less than 60 degrees, and more preferably equal to or less than 50 degrees.

In the shaft 6, the sheets constituting the bias layer are the second sheet s2 and the fourth sheet s4. The sheet s2 is also referred to as a first bias sheet. The sheet s4 is also referred to as a second bias sheet. As described above, in FIG. 2, the angle Af is described in each sheet. The plus (+) and minus (−) in the angle Af show that the fibers of bias sheets are inclined in opposite directions to each other. In the present application, the sheet constituting the bias layer is also merely referred to as a bias sheet. The sheet s2 and the sheet s4 constitute a united sheet to be described later.

In FIG. 2, the inclination direction of the fiber of the sheet s4 is equal to the inclination direction of the fiber of the sheet s2. However, the sheet s4 is reversed, and applied on the sheet s2. As a result, the direction of the angle Af of the sheet s2 and the direction of the angle Af of the sheet s4 are opposite to each other. In light of this point, in the embodiment of FIG. 2, the angle Af of the sheet s2 is described as −45 degrees and the angle Af of the sheet s4 is described as +45 degrees.

The shaft 6 has a hoop layer. The shaft 6 has a plurality of hoop layers. The shaft 6 includes five hoop layers. In the shaft 6, the hoop layers are a layer s3, a layer s6, a layer s8, a layer s10, and a layer s13. In the shaft 6, the sheets forming the hoop layers are the third sheet s3, the sixth sheet s6, the eighth sheet s8, the tenth sheet s10, and the thirteenth sheet s13. In the present application, the sheet forming the hoop layer is also referred to as a hoop sheet.

Preferably, the absolute angle θa in the hoop layer is substantially 90 degrees to the axis line of the shaft. However, the orientation direction of the fiber to the axial direction of the shaft may not be completely set to 90 degrees due to an error or the like in winding. In the hoop layer, the angle Af is usually −90 degrees or greater and −80 degrees or less, or 80 degrees or greater and 90 degrees or less. In other words, in the hoop layer, the absolute angle θa is usually 80 degrees or greater and 90 degrees or less.

The number of plies (number of windings) of one sheet is not limited. For example, if the number of plies of the sheet is 1, the sheet is wound by one round in a circumferential direction. For example, if the number of plies of the sheet is 2, the sheet is wound by two rounds in the circumferential direction. For example, if the number of plies of the sheet is 1.5, the sheet is wound by 1.5 rounds in the circumferential direction. When the number of plies of the sheet is 1.5, the sheet forms one layer at the circumferential position of 0 to 180 degrees, and forms two layers at the circumferential position of 180 to 360 degrees.

In light of suppressing winding fault such as wrinkles, a sheet having a too large width is not preferable. In this respect, the number of plies of one bias sheet is preferably equal to or less than 4, and more preferably equal to or less than 3. In light of the working efficiency of the winding process, the number of plies of the bias sheet is preferably equal to or greater than 1.

In light of suppressing winding fault such as wrinkles, a sheet having a too large width is not preferable. In this respect, the number of plies of one straight sheet is preferably equal to or less than 4, more preferably equal to or less than 3, and still more preferably equal to or less than 2. In light of the working efficiency of the winding process, the number of plies of the straight sheet is preferably equal to or greater than 1. The number of plies may be 1 in all the straight sheets.

In a full length sheet, winding fault is apt to occur. In light of suppressing the winding fault, the number of plies of one sheet in all full length straight sheets is preferably equal to or less than 2. The number of plies may be 1 in all the full length straight sheets.

In light of suppressing winding fault such as wrinkles, a sheet having a too large width is not preferable. In this respect, the number of plies of one hoop sheet is preferably equal to or less than 4, more preferably equal to or less than 3, and still more preferably equal to or less than 2. In light of the working efficiency of the winding process, the number of plies of the hoop sheet is preferably equal to or greater than 1. In all the hoop sheets (hoop layers), the number of plies may be equal to or less than 2.

Winding fault is apt to occur in the full length sheet. In light of suppressing the winding fault, the number of plies of one sheet in all full length hoop sheets is preferably equal to or less than 2. The number of plies may be 1 in all the full length hoop sheets.

Although not shown in the drawings, the prepreg sheet before being used is sandwiched between cover sheets. The cover sheets are usually a mold release paper and a resin film. The prepreg sheet before being used is sandwiched between the mold release paper and the resin film. The mold release paper is applied on one surface of the prepreg sheet, and the resin film is applied on the other surface of the prepreg sheet. Hereinafter, the surface on which the mold release paper is applied is also referred to as "a surface of a mold release paper side", and the surface on which the resin film is applied is also referred to as "a surface of a film side".

In the developed view of the present application, the surface of the film side is the front side. That is, in FIG. 2, the front side of the figure is the surface of the film side, and the back side of the figure is the surface of the mold release paper side.

In order to wind the prepreg sheet, the resin film is first peeled. The surface of the film side is exposed by peeling the resin film. The exposed surface has tacking property (tackiness). The tacking property is caused by the matrix resin. That is, since the matrix resin is in a semi-cured state, the tackiness is developed. The edge part of the exposed surface of the film side is also referred to as a winding start edge part. Next, the winding start edge part is applied to a wound object. The winding start edge part can be smoothly applied by the tackiness of the matrix resin. The wound object is a mandrel or a wound article obtained by winding other prepreg sheet(s) around the mandrel. Next, the mold release paper is peeled. Next, the wound object is rotated to wind the prepreg sheet around the wound object. In this way, after the resin film is peeled and the winding start edge part is applied to the wound object, the mold release paper is peeled. The procedure suppresses wrinkles and winding fault of the sheet. This is because the sheet to which the mold release paper is applied is supported by the mold release paper, and is less likely to cause wrinkles. The mold release paper has flexural rigidity higher than the flexural rigidity of the resin film.

In the embodiment of FIG. 2, some of the sheets are used as a united sheet. The united sheet is formed by stacking two or more sheets. All the hoop sheets are wound in a state of the united sheet. The winding fault of the hoop sheet is suppressed by the winding method.

As described above, in the present application, the sheets and the layers are classified by the orientation angle of the fiber. Furthermore, in the present application, the sheets and the layers are classified by the axial-direction length.

In the present application, a layer substantially wholly disposed in the axial direction of the shaft is referred to as a full length layer. In the present application, a sheet substantially wholly disposed in the axial direction of the shaft is referred to as a full length sheet. The wound full length sheet forms the full length layer.

A point separated by 20 mm from the tip end Tp in the axial direction is defined as Tp1, and a region between the tip end Tp and the point Tp1 is defined as a first region. A point separated by 100 mm from the butt end Bt in the axial direction is defined as Bt1, and a region between the butt end Bt and the point Bt1 is defined as a second region. The first region and the second region have a limited influence on the performance of the shaft. In this respect, the full length sheet may not be present either in the first region or in the second region. Preferably, the full length sheet extends from the tip end Tp to the butt end Bt. In other words, the full length sheet is preferably wholly disposed in the axial direction of the shaft.

In the present application, a layer partially disposed in the axial direction of the shaft is referred to as a partial layer. In the present application, a sheet partially disposed in the axial direction of the shaft is referred to as a partial sheet. The wound partial sheet forms the partial layer. The axial-direction length of the partial sheet is shorter than the axial-direction length of the full length sheet. Preferably, the axial-direction length of the partial sheet is equal to or less than half the full length of the shaft.

In the present application, the full length layer which is the straight layer is referred to as a full length straight layer. In the embodiment of FIG. 2, the full length straight layers are a layer s11 and a layer s14. The full length straight sheets are the sheet s11 and the sheet s14.

In the present application, the full length layer which is the hoop layer is referred to as a full length hoop layer. In the embodiment of FIG. 2, the full length hoop layers are the layer s3 and the layer s13. The full length hoop sheets are the sheet s3 and the sheet s13.

In the present application, the partial layer which is the straight layer is referred to as a partial straight layer. In the embodiment of FIG. 2, the partial straight layers are a layer s1, a layer s5, a layer s7, a layer s9, a layer s15, and a layer s16. Partial straight sheets are the sheet s1, the sheet s5, the sheet s7, the sheet s9, the sheet s15, and the sheet s16.

In the present application, the partial layer which is the hoop layer is referred to as a partial hoop layer. In the embodiment of FIG. 2, the partial hoop layers are the layer s6, the layer s8, and the layer s10. Partial hoop sheets are the sheet s6, the sheet s8, and the sheet s10.

The term "butt partial layer" is used in the present application. Examples of the butt partial layer include a butt partial straight layer and a butt partial hoop layer. In the embodiment of FIG. 2, the butt partial straight layers are the layer s5, the layer s7 and a layer s12. Butt partial straight sheets are the sheet s5, the sheet s7 and the sheet s12.

The embodiment of FIG. 2 includes the butt partial hoop layer s6. One end of the butt partial hoop layer s6 is located at the butt end Bt. The embodiment of FIG. 2 includes the butt partial hoop layer s8. One end of the butt partial hoop layer s8 is located at the butt end Bt. The embodiment of FIG. 2 includes the plurality of butt partial hoop layers s6 and s8.

An axial-direction distance between the butt partial layer (butt partial sheet) and the butt end Bt is preferably equal to or less than 100 mm, more preferably equal to or less than 50 mm, and still more preferably 0 mm. In the embodiment, the distance is 0 mm in all the butt partial layers.

The term "tip partial layer" is used in the present application. An axial-direction distance between the tip partial layer (tip partial sheet) and the tip end Tp is preferably equal to or less than 40 mm, more preferably equal to or less than 30 mm, still more preferably equal to or less than 20 mm, and yet still more preferably 0 mm. In the embodiment, the distance is 0 mm in all the tip partial layers.

Examples of the tip partial layer include a tip partial straight layer. In the embodiment of FIG. 2, the tip partial straight layers are the layer s1, the layer s9, the layer s15, and the layer s16. The tip partial straight sheets are the sheet s1, the sheet s9, the sheet s15, and the sheet s16.

The embodiment of FIG. 2 includes the middle partial hoop layer s10. A butt-side end of the middle partial hoop layer s10 is located apart from the butt end Bt. A tip-side end of the middle partial hoop layer s10 is located apart from the tip end Tp. The partial hoop layer s10 is disposed in the whole of a middle region R2 (to be described later).

The shaft 6 is produced by the sheet-winding method using the sheets shown in FIG. 2.

Hereinafter, a manufacturing process of the shaft 6 will be schematically described.

[Outline of Manufacturing Process of Shaft]
(1) Cutting Process

The prepreg sheet is cut into a desired shape in the cutting process. Each of the sheets shown in FIG. 2 is cut out by the process.

The cutting may be performed by a cutting machine. The cutting may be manually performed. In the manual case, for example, a cutter knife is used.

(2) Stacking Process

In the stacking process, the united sheets described above are produced.

In the stacking process, heating or a press may be used. More preferably, the heating and the press are used in combination. In a winding process to be described later, the deviation of the sheet may be generated during the winding operation of the united sheet. The deviation reduces winding accuracy. The heating and the press improve an adhesive force between the sheets. The heating and the press suppress the deviation between the sheets in the winding process.

(3) Winding Process

A mandrel is prepared in the winding process. A typical mandrel is made of a metal. A mold release agent is applied to the mandrel. Furthermore, a resin having tackiness is applied to the mandrel. The resin is also referred to as a tacking resin. The cut sheet is wound around the mandrel. The tacking resin facilitates the application of the end part of the sheet to the mandrel.

The sheets are wound in order described in the developed view. The sheet located on a more upper side in the developed view is earlier wound. The sheets to be stacked are wound in a state of the united sheet.

A winding body is obtained in the winding process. The winding body is obtained by winding the prepreg sheets around the outside of the mandrel. For example, the winding is achieved by rolling the wound object on a plane. The winding may be performed by a manual operation or a machine. The machine is referred to as a rolling machine.

(4) Tape Wrapping Process

A tape is wrapped around the outer peripheral surface of the winding body in the tape wrapping process. The tape is also referred to as a wrapping tape. The tape is wrapped while tension is applied to the tape. A pressure is applied to the winding body by the wrapping tape. The pressure reduces voids.

(5) Curing Process

In the curing process, the winding body after performing the tape wrapping is heated. The heating cures the matrix resin. In the curing process, the matrix resin fluidizes temporarily. The fluidization of the matrix resin can discharge air between the sheets or in the sheet. The pressure (fastening force) of the wrapping tape accelerates the discharge of the air. The curing provides a cured laminate.

(6) Process of Extracting Mandrel and Process of Removing Wrapping Tape

The process of extracting the mandrel and the process of removing the wrapping tape are performed after the curing process. The process of removing the wrapping tape is preferably performed after the process of extracting the mandrel in light of improving the efficiency of the process of removing the wrapping tape.

(7) Process of Cutting Both Ends

Both the end parts of the cured laminate are cut in the process. The cutting flattens the end face of the tip end Tp and the end face of the butt end Bt.

In order to facilitate the understanding, in the developed view of the present application, the sheets after both the ends are cut are shown. In fact, the cutting of both the ends is considered in the size in cutting. That is, in fact, the cutting is performed in a state where the sizes of both end portions to be cut are added.

(8) Polishing Process

The surface of the cured laminate is polished in the process. Spiral unevenness is present on the surface of the cured laminate. The unevenness is the trace of the wrapping tape. The polishing extinguishes the unevenness to smooth the surface of the cured laminate. Preferably, whole polishing and tip partial polishing are conducted in the polishing process.

(9) Coating Process

The cured laminate after the polishing process is subjected to coating.

The shaft 6 is obtained in the processes.

[1. Specifications of Shaft]

The inventors of the present application have studied improvement of golf club shafts from a new viewpoint. As a result, it has been found that the butt end GLL is effective for improvement in easiness of swing. The butt end GLL is detailed later. The inventors have found that easiness of swing is improved by making the forward flex and the backward flex of a shaft suitable for the butt end GLL.

[1-1. Butt End GLL]

As described above, the distance between the butt end Bt and the center of gravity Gs of the shaft is represented by L (centimeter). The weight of the shaft is represented by Ws (kilogram). The butt end GLL (kg·cm²) is calculated by the following formula:

Butt end $GLL = Ws \times L \times L$

[1-2. Forward Flex f1]

Figure 3:
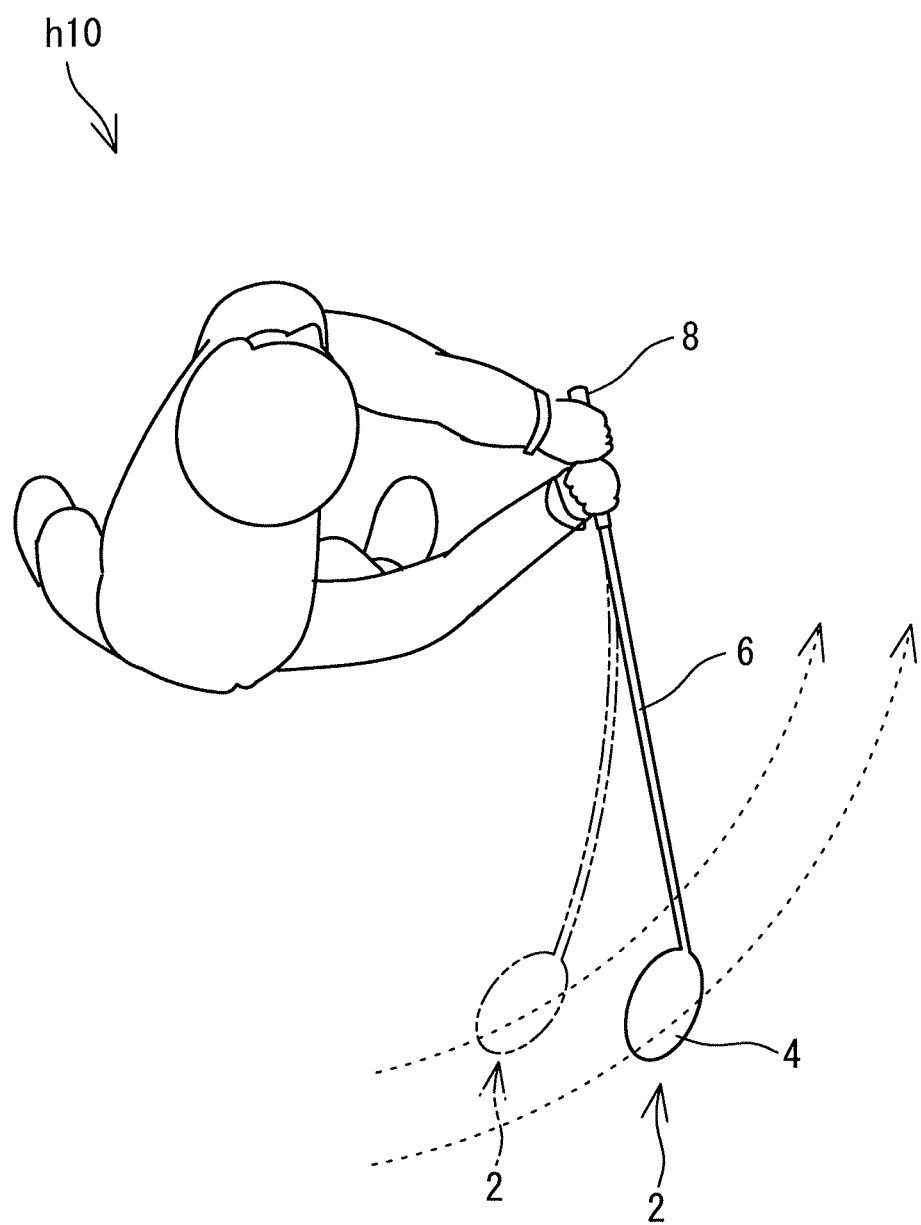
FIG. 3 is a view showing a golf player swinging a golf club as viewed from above.

FIG. 3 is a view of a swinging golf player h10 as viewed from above. FIG. 3 shows an initial stage of downswing.

In the initial stage of downswing, the angular acceleration becomes maximum and the shaft 6 is flexed. The shaft 6 is so flexed that the head delays relative to the travel direction of the swing.

By the flexure in the initial stage of downswing, the center of gravity Gs of the shaft and the center of gravity G of the head are so displaced as to approach the swing axis (body of the golf player). Therefore, the moment of inertia of the club 2 about the swing axis is reduced, which enables the golf player to swing the club 2 swiftly (acceleration effect). This flexure can be increased by increasing the forward flex f1. The flexure in the initial stage increases flexure return in the latter stage of the downswing (flexure-return effect). The flexure return contributes to increase in head speed.

[1-3. f2/(f1+f2)]

The flexural rigidity of a grip-vicinity portion is mainly reflected in the forward flex f1. On the other hand, the flexural rigidity of a head-vicinity portion is mainly reflected in the backward flex f2. A hand side (grip-vicinity portion) of the shaft becomes flexible by increasing the f1. The displacement to the swing axis is increased by flexing the hand side. For this reason, the acceleration effect is enhanced (displacement increasing effect 1). In addition, the amount of displacement return involved in the flexure return is also increased by increasing the displacement in the initial stage of downswing (displacement increasing effect 2). For this reason, the flexure return effect is enhanced, which can improve the head speed. Note that if the f1 is excessively large, the flexure may not completely return, and thus the displacement increasing effect 2 is reduced. On the other hand, when the f2 is increased, the head speed can be improved. In this case, however, the tip side of the shaft is flexed to increase the influence of the flexure on the face angle, and to increase variations in face angle at impact, which results in less stability. For these reasons, there is a preferably value for f2/(f1+f2). When this value is excessively small, the head speed is difficult to increase. When this value is excessively large, the shaft has less stability.

[1-4. Shaft Length Ls, Shaft Weight Ws, Shaft Torque]

When the shaft is longer, the displacement is apt to be increased, which makes it easier to obtain the acceleration effect and the flexure return effect. In this respect, the shaft is preferably longer. In light of easiness of swing and directional stability of a hit ball, the shaft is preferably lightweight and the shaft torque is preferably suppressed.

[3. Preferable Values]

Preferable values for specifications are as follows.

[3-1. Butt End GLL]

In light of easiness of swing, the butt end GLL is preferably equal to or less than 110 kg·cm², more preferably equal to or less than 109 kg·cm², still more preferably equal to or less than 108 kg·cm², and yet still more preferably equal to or less than 107 kg·cm². In view of restriction on design, the butt end GLL is preferably equal to or greater than 70 kg·cm², more preferably equal to or greater than 75 kg·cm², and still more preferably equal to or greater than 78 kg·cm². When the easiness of swing is improved, variations in swing are reduced, and a face angle at impact is stabilized. Also in this respect, the butt end GLL preferably falls within the above range.

[3-2. Forward Flex f1]

By increasing the forward flex f1, the flexure in the initial stage of downswing is increased, and thus the acceleration effect and the flexure return effect can be improved. In this respect, the forward flex f1 is preferably equal to or longer than 130 mm, more preferably equal to or longer than 140 mm, and still more preferably equal to or longer than 150 mm. An excessively large forward flex f1 can impair the flexure return. In this respect, the forward flex f1 is preferably equal to or less than 200 mm, more preferably equal to or less than 178 mm, and still more preferably equal to or less than 165 mm.

[3-3. f2/(f1+f2)]

In light of the displacement increasing effect and stability of the face angle, f2/(f1+f2) is preferably equal to or less than 0.50, more preferably equal to or less than 0.49, and still more preferably equal to or less than 0.48. In view of restriction on design, f2/(f1+f2) is equal to or greater than 0.44, more preferably equal to or greater than 0.45, and still more preferably equal to or greater than 0.46.

Adjusting methods of the forward flex f1 and the backward flex f2 are not limited, and examples of the methods include the following (a) to (g).

(a) To increase or decrease the number of windings of the tip partial layer.

(b) To change the fiber elastic modulus of the tip partial layer.

(c) To change the axial-direction length of the tip partial layer.

(d) To increase or decrease the number of windings of the butt partial layer.

(e) To change the fiber elastic modulus of the butt partial layer.

(f) To change the axial-direction length of the butt partial layer.

(g) To change a taper angle of the shaft (mandrel).

[3-4. Shaft Length Ls]

In light of the acceleration effect and the flexure return effect, the shaft length Ls is preferably equal to or longer than 43 inches, more preferably equal to or longer than 44 inches, and still more preferably equal to or longer than 45 inches. An excessively long shaft length Ls can impair the flexure return. In this respect, the shaft length Ls is equal to or less than 48 inches, more preferably equal to or less than 47 inches, and still more preferably equal to or less than 46 inches.

[3-5. Shaft Weight Ws]

In light of decreasing the butt end GLL, the shaft weight Ws is preferably equal to or less than 50 g, more preferably equal to or less than 48 g, still more preferably equal to or less than 46 g, and yet still more preferably equal to or less than 44 g. In light of restriction on design, the shaft weight Ws is equal to or greater than 30 g, more preferably equal to or greater than 32 g, and still more preferably equal to or greater than 34 g.

[3-6. Shaft Torque]

In light of directional stability of a hit ball, the shaft torque of the shaft 6 is preferably equal to or less than 7.5 degrees, more preferably equal to or less than 7.3 degrees, and still more preferably equal to or less than 7.1 degrees. In view of limitation in a lightweight shaft, the shaft torque is preferably equal to or greater than 6.0 degrees, more preferably equal to or greater than 6.2 degrees, and still more preferably equal to or greater than 6.4 degrees.

[4. Measurement Method]

Methods for measuring respective specifications are as follows.

[4-1. Forward Flex f1, Backward Flex f2]

Figure 4A:
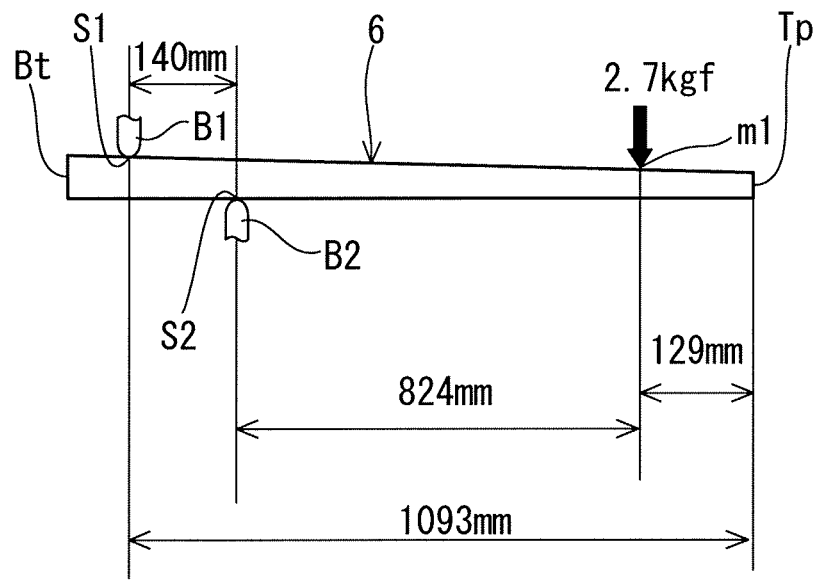
FIG. 4(*a*) is a schematic view showing a method for measuring a forward flex, and FIG. 4(*b*) is a schematic view showing a method for measuring a backward flex.

FIG. 4(a) shows a method for measuring the forward flex f1. As shown in FIG. 4(a), a first supporting point S1 is set at a position separated by 1093 mm from the tip end Tp. Furthermore, a second supporting point S2 is set at a position separated by 953 mm from the tip end Tp. A support B1 supporting the shaft 6 from above is provided at the first supporting point S1. A support B2 supporting the shaft 6 from the underside is provided at the second supporting point S2. In a state where no load is applied, the shaft axis line of the shaft 6 is horizontal. At a load point m1 separated by 129 mm from the tip end Tp, a load of 2.7 kgf is allowed to act in a vertical downward direction. A distance (mm) between the position of the load point m1 at a state where no load is applied and the position of the load point m1 at a state where the load is applied to settle the position is the forward flex. The distance is measured along the vertical direction.

The section shape of a portion (hereinafter, referred to as an abutting portion) of the support B1 abutting on the shaft is as follows. The section shape of the abutting portion of the support B1 has convex roundness in a section parallel to the axial direction of the shaft. The curvature radius of the roundness is 15 mm. The section shape of the abutting portion of the support B1 has concave roundness in a section perpendicular to the axial direction of the shaft. The curvature radius of the concave roundness is 40 mm. The horizontal length (a length in a depth direction in FIG. 4(a)) of the abutting portion of the support B1 is 15 mm in the section perpendicular to the axial direction of the shaft. The section shape of the abutting portion of the support B2 is the same as that of the support B1. The section shape of the abutting portion of a load indenter (not shown) applying a load of 2.7 kgf to the load point m1 has convex roundness in the section parallel to the axial direction of the shaft. The curvature radius of the roundness is 10 mm. The section shape of the abutting portion of a load indenter (not shown) applying a load of 2.7 kgf to the load point m1 is a straight line in the section perpendicular to the axial direction of the shaft. The length of the straight line is 18 mm. A weight including the load indenter is hung at the load point m1.

Figure 4B:
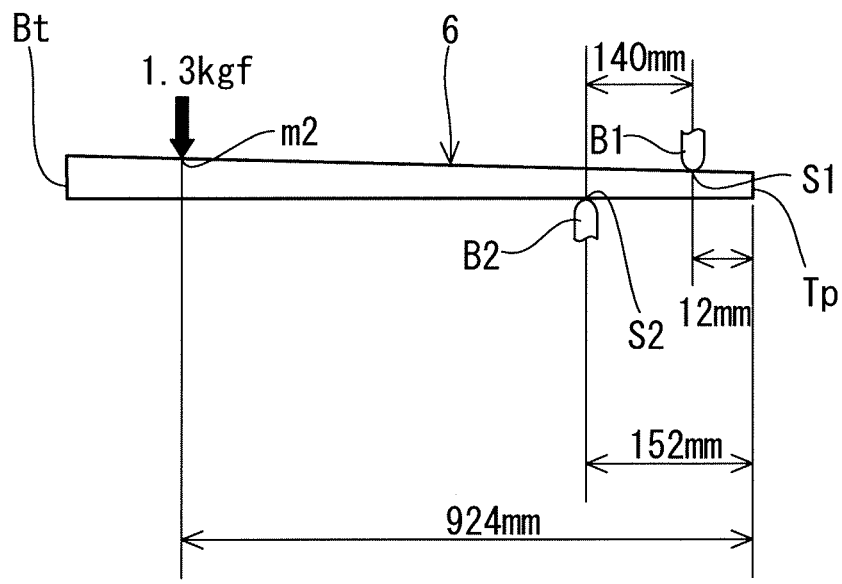

FIG. 4(b) shows a method for measuring a backward flex f2. The backward flex is measured in the same manner as in the forward flex except that the first supporting point S1 is set to a point separated by 12 mm from the tip end Tp; the second supporting point S2 is set to a point separated by 152 mm from the tip end Tp; a load point m2 is set to a point separated by 924 mm from the tip end Tp; and a load is set to 1.3 kgf.

[4-2. Shaft Torque]

Figure 5:
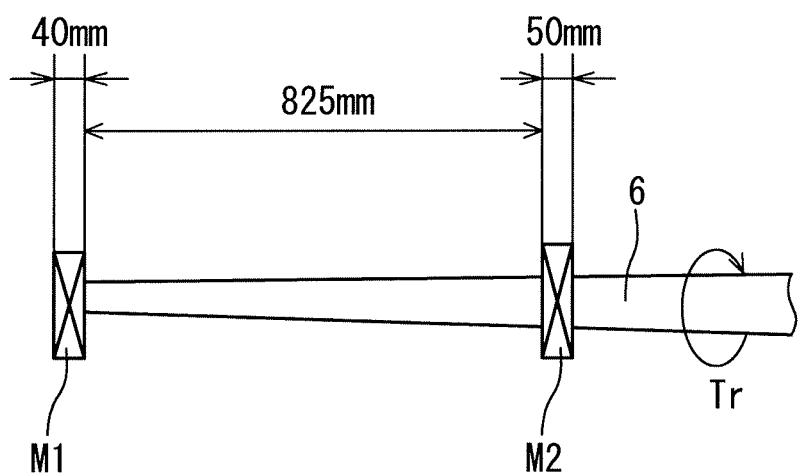
FIG. 5 is a schematic view showing a method for measuring a shaft torque.

FIG. 5 shows a method for measuring the shaft torque. A jig M1 is fixed in a width of 40 mm from the tip end Tp. The fixation is achieved by an air chuck, and the air pressure of the air chuck is 2.0 kgf/cm$^2$. A jig M2 is fixed in a width of 50 mm from a position separated by 825 mm from the jig M1. The fixation is achieved by an air chuck, and the air pressure of the air chuck is 1.5 kgf/cm$^2$. A torque Tr of 13.9 kg·cm is applied to the shaft 6 by rotating the jig M2 while fixing the jig M1. A torsional angle due to the torque is the shaft torque.

[5. Laminated Constitution]

A preferable laminated constitution is as follows.

[5-1. Glass Fiber Reinforced Layer as Butt Partial Layer]

The butt partial layer of the shaft 6 preferably includes a glass fiber reinforced layer. In the embodiment of FIG. 2, the sheet s7 is the glass fiber reinforced layer. Note that the layers other than the grass fiber reinforced layer s7 are carbon fiber reinforced layers.

The glass fiber has a specific gravity greater than that of the carbon fiber. The distance L can be effectively shortened by using the glass fiber reinforced layer as the butt partial layer. The glass fiber reinforced layer used for the butt side contributes to decrease of the butt end GLL.

The elastic modulus of the glass fiber is as low as 7 to 8 ton/mm$^2$. Therefore, even when the glass fiber reinforced layer is used for the butt partial layer, the forward flex f1 is not excessively decreased. That is, the glass fiber reinforced layer does not hamper the decrease of f2/(f1+f2).

The butt partial layer is located close to golf player's hands. The glass fiber is excellent in impact absorbing performance. Hit feeling is improved by using the glass fiber reinforced layer as the butt partial layer.

A double-pointed arrow P1 in FIG. 2 shows an axial-direction length of the glass fiber reinforced layer which is the butt partial layer. In light of decreasing the butt end GLL, the length P1 is preferably equal to or longer than 100 mm, more preferably equal to or longer than 150 mm, and still more preferably equal to or longer than 180 mm. If the P1 is excessively long, the shaft weight Ws can be excessively large. In this respect, the length P1 is preferably equal to or shorter than 350 mm, more preferably equal to or shorter than 300 mm, and still more preferably equal to or shorter than 250 mm.

[5-2. Hoop Layer As Butt Partial Layer]

The shaft 6 preferably has the butt partial hoop layer. The embodiment of FIG. 2 has the plurality of butt partial hoop layers. In the embodiment of FIG. 2, the butt partial hoop layers are the layer s6 and the layer s8.

The butt partial hoop layer suppresses crushing deformation, and thus effectively reinforces the butt portion having a larger diameter. In addition, since the butt partial hoop layer has hardly any influence on flexural rigidity, the flexural rigidity of the butt portion is suppressed. The butt partial hoop layer is useful for increasing the forward flex f1 and for decreasing f2/(f1+f2).

The butt partial hoop layer increases weight distribution to the butt portion by its own weight. The butt partial hoop layer contributes to displacing the center of gravity Gs of the shaft to the butt end Bt side. The butt partial hoop layer contributes to decreasing the distance L. The butt partial hoop layer contributes to decreasing the butt end GLL.

A double-pointed arrow P2 in FIG. 2 shows an axial-direction length of the butt partial hoop layer. In light of improvement in strength of the butt portion and suppression of the butt end GLL, the length P2 is preferably equal to or longer than 100 mm, more preferably equal to or longer than 150 mm, and still more preferably equal to or longer than 180 mm. If the P2 is excessively long, partiality of the butt partial hoop layer is reduced, which decreases the effect of displacing the center of gravity Gs of the shaft to be closer to the butt end Bt. In this respect, the length P2 is preferably equal to or shorter than 400 mm, more preferably equal to or shorter than 350 mm, and still more preferably equal to or shorter than 300 mm.

[5-3. Hoop Layer and Glass Fiber Reinforced Layer as Butt Partial Layer]

In the embodiment of FIG. 2, the glass fiber reinforced layer s7 is used as the first butt partial layer. The glass fiber reinforced layer s7 is a straight layer. In addition, in the embodiment of FIG. 2, hoop layers s6 and s8 are used as the second butt partial layers. These butt partial hoop layers s6 and s8 are carbon fiber reinforced layers. The suppressions of f2/(f1+f2) and the butt end GLL are effectively attained by the synergistic effect of the first butt partial layer and the second butt partial layers. Furthermore, strength and hit feeling can be improved.

[5-4. Bias Sheet having Wide Width on Tip End Tp Side]

As shown in FIG. 2, in the bias sheet s2, a width Wt at the tip end Tp is greater than a width Wb at the butt end Bt. Similarly, in the bias sheet s4, a width Wt at the tip end Tp is greater than a width Wb at the butt end Bt. By this constitution, the weight of the bias layer is suppressed and torsional rigidity of the shaft can be improved. This constitution contributes to achieving both decrease of the shaft torque and weight reduction of the shaft.

[5-5. Partial Straight Layers Overlapping Each Other]

The embodiment of FIG. 2 includes the butt partial straight layer s5 and the tip partial straight layer s9. The butt partial straight layer s5 and the tip partial straight layer s9 overlap each other in an axial-direction region. That is, an overlap region V1 is formed by the butt partial straight layer s5 and the tip partial straight layer s9. In other words, a tip end E1 of the butt partial straight layer s5 is located at a tip side with respect to a butt end E2 of the tip partial straight layer s9. Note that the overlap region V1 is a region in the axial direction.

The overlap region V1 is included in the middle region R2. As shown in FIG. 2, the shaft 6 is divided into a tip region R1, the middle region R2, and a butt region R3 by dividing the shaft 6 into three equal parts in the axial direction. The whole overlap region V1 is included in the middle region R2.

The fiber elastic modulus of the butt partial straight layer s5 is smaller than the fiber elastic modulus of the tip partial straight layer s9. For this reason, flexure is apt to occur in a portion located on the butt end Bt side with respect to the overlap region V1. As a result, the forward flex f1 is increased, and f2/(f1+f2) is decreased.

Thus, the fiber elastic modulus of the straight layers is changed at an intermediate position in the axial direction to enhance the degree of freedom in distribution of flexural rigidity, and thus f2/(f1+f2) can be adjusted to a desired value. On the other hand, as compared with a full length straight layer which does not have any joint over the full length of the shaft, stress is apt to be concentrated on a joint between the layer s5 and the layer s9. Furthermore, when the fiber elastic modulus of the layer s5 is different from that of the layer s9, stress is apt to be concentrated on the joint. The overlap region V1 can effectively relieve the concentration of the stress and enhance the strength of the shaft 6.

As described above, the shaft 6 is flexed in downswing. This flexure is an elastic deformation. Restoring the elastic deformation is also referred to as flexure return. The flexure return accelerates the head speed. The flexure return enhances easiness of swing.

As described above, the straight layer has a great influence on flexural deformation. The joint exerts an influence on the flexural deformation and can deteriorate the flexure return. The overlap region V1 can solve this problem. The overlap region V1 facilitates the flexure return at the joint of the partial straight layers and can enhance easiness of swing.

As described above, the overlap region V1 is included in the middle region R2. When the overlap region V1 is located in the butt region R3, the rigidity of the butt region R3 is increased. In this case, the shaft is hard to have a high flex point. That is, f2/(f1+f2) is difficult to decrease. The f2/(f1+f2) is easily decreased by locating the overlap region V1 in the middle region R2. When the overlap region V1 is located in the tip region R1, it might be difficult to hit a ball high due to a shortage of flexure in the tip portion of the shaft.

As to the butt partial straight layer s5 and the tip partial straight layer s9 including the overlap region V1, the fiber elastic modulus of the butt partial straight layer s5 is represented by EM1 ($t/mm^2$), and the fiber elastic modulus of the tip partial straight layer s9 is represented by EM2 ($t/mm^2$). In light of decreasing f2/(f1+f2), a difference (EM2-EM1) is preferably equal to or greater than 5, more preferably equal to or greater than 6, and still more preferably equal to or greater than 9. An excessively large EM2 can reduce the strength of the tip portion of the shaft. In this respect, the difference (EM2-EM1) is preferably equal to or less than 22, more preferably equal to or less than 20, and still more preferably equal to or less than 15.

In light of suppressing f2/(f1+f2), EM2 is preferably equal to or greater than 30 ($t/mm^2$), more preferably equal to or greater than 31 ($t/mm^2$), and still more preferably equal to or greater than 33 ($t/mm^2$). In light of strength, EM2 is preferably equal to or less than 50 ($t/mm^2$), more preferably equal to or less than 46 ($t/mm^2$), and still more preferably equal to or less than 40 ($t/mm^2$).

In light of enhancing the effect of the overlap region V1, the overlap region V1 has an axial-direction length of preferably equal to or longer than 50 mm, more preferably equal to or longer than 100 mm, and still more preferably equal to or longer than 150 mm. In light of suppressing the shaft weight Ws, the axial-direction length of the overlap region V1 is preferably equal to or shorter than 400 mm, more preferably equal to or shorter than 300 mm, and still more preferably equal to or shorter than 250 mm.

[5-6. Partial Hoop Layer Disposed in Overlap Region V1]

The joint of straight layers is present in the overlap region V1. The joint exerts an influence on the flexural shape of the shaft and can bring stress concentration. In the embodiment of FIG. 2, the partial hoop layer s10 is disposed in the overlap region V1. For this reason, an abnormal deformation at the joint is suppressed and the stress concentration can be relieved. In addition, the partial hoop layer s10 is partially used in only middle portion and thus the weight thereof is suppressed.

The hoop layer can facilitate the restoration of crushing deformation. The crushing deformation is such a deformation that the cross section of the shaft becomes an elliptical shape. Since the shaft is a tubular body, the crushing deformation is involved in the flexural deformation of the shaft. The crushing deformation is linked with the flexural deformation. The flexural deformation is restored by the restoration of the crushing deformation. Since the hoop layer facilitates the restoration of the crushing deformation, the hoop layer can also facilitate the restoration of the flexural deformation. The hoop layer provided in the overlap region V1 can facilitate the flexure return caused by the overlap region V1. The facilitation of the flexure return can improve head speed and easiness of swing.

The middle partial hoop layer s10 is a hoop layer, and thus has a smaller influence on the flexural rigidity as compared with the straight layer. Therefore, the influences of the middle partial hoop layer s10 on the forward flex f1 and f2/(f1+f2) are small. The middle partial hoop layer s10 is useful for facilitating the design of the forward flex f1 and f2/(f1+f2).

The following tables 1 and 2 show examples of utilizable prepregs. Properties of the shaft such as the forward flex f1 and the backward flex f2 can be accurately adjusted by selecting appropriate prepregs among various kinds of prepregs which are commercially available.

TABLE 1

Examples of utilizable prepregs

| Manufacturer | Trade name | Thickness of sheet (mm) | Fiber content (% by weight) | Resin content (% by weight) | Part number of fiber | Tensile elastic modulus (t/mm$^2$) | Tensile strength (kgf/mm$^2$) |
|---|---|---|---|---|---|---|---|
| Toray Industries, Inc. | 3255S-10 | 0.082 | 76 | 24 | T700S | 24 | 500 |
| Toray Industries, Inc. | 3255S-12 | 0.103 | 76 | 24 | T700S | 24 | 500 |
| Toray Industries, Inc. | 3255S-15 | 0.123 | 76 | 24 | T700S | 24 | 500 |
| Toray Industries, Inc. | 2255S-10 | 0.082 | 76 | 24 | T800S | 30 | 600 |
| Toray Industries, Inc. | 2255S-12 | 0.102 | 76 | 24 | T800S | 30 | 600 |
| Toray Industries, Inc. | 2255S-15 | 0.123 | 76 | 24 | T800S | 30 | 600 |
| Toray Industries, Inc. | 2256S-10 | 0.077 | 80 | 20 | T800S | 30 | 600 |
| Toray Industries, Inc. | 2256S-12 | 0.103 | 80 | 20 | T800S | 30 | 600 |
| Toray Industries, Inc. | 2276S-10 | 0.077 | 80 | 20 | T800S | 30 | 600 |
| Toray Industries, Inc. | 805S-3 | 0.034 | 60 | 40 | M30S | 30 | 560 |
| Toray Industries, Inc. | 8053S-3 | 0.028 | 70 | 30 | M30S | 30 | 560 |
| Toray Industries, Inc. | 9255S-7A | 0.056 | 78 | 22 | M40S | 40 | 470 |
| Toray Industries, Inc. | 9255S-6A | 0.047 | 76 | 24 | M40S | 40 | 470 |
| Toray Industries, Inc. | 925AS-4C | 0.038 | 65 | 35 | M40S | 40 | 470 |
| Toray Industries, Inc. | 9053S-4 | 0.027 | 70 | 30 | M40S | 40 | 470 |
| Nippon Graphite Fiber Co., Ltd. | E1026A-09N | 0.100 | 63 | 37 | XN-10 | 10 | 190 |
| Nippon Graphite Fiber Co., Ltd | E1026A-14N | 0.150 | 63 | 37 | XN-10 | 10 | 190 |

The tensile strength and the tensile elastic modulus are measured in accordance with "Testing Method for Carbon Fibers" JIS R7601: 1986.

TABLE 2

Examples of utilizable prepregs

| Manufacturer | Trade name | Thickness of sheet (mm) | Fiber content (% by weight) | Resin content (% by weight) | Part number of fiber | Tensile elastic modulus (t/mm$^2$) | Tensile strength (kgf/mm$^2$) |
|---|---|---|---|---|---|---|---|
| Mitsubishi Rayon Co., Ltd. | GE352H-160S | 0.150 | 65 | 35 | E glass | 7 | 320 |

TABLE 2-continued

Examples of utilizable prepregs

| Manufacturer | Trade name | Thickness of sheet (mm) | Fiber content (% by weight) | Resin content (% by weight) | Part number of fiber | Tensile elastic modulus (t/mm$^2$) | Tensile strength (kgf/mm$^2$) |
|---|---|---|---|---|---|---|---|
| Mitsubishi Rayon Co., Ltd. | TR350C-100S | 0.083 | 75 | 25 | TR50S | 24 | 500 |
| Mitsubishi Rayon Co., Ltd. | TR350U-100S | 0.078 | 75 | 25 | TR50S | 24 | 500 |
| Mitsubishi Rayon Co., Ltd. | TR350C-125S | 0.104 | 75 | 25 | TR50S | 24 | 500 |
| Mitsubishi Rayon Co., Ltd. | TR350C-150S | 0.124 | 75 | 25 | TR50S | 24 | 500 |
| Mitsubishi Rayon Co., Ltd. | TR350C-175S | 0.147 | 75 | 25 | TR50S | 24 | 500 |
| Mitsubishi Rayon Co., Ltd. | MR350J-025S | 0.034 | 63 | 37 | MR40 | 30 | 450 |
| Mitsubishi Rayon Co., Ltd. | MR350J-050S | 0.058 | 63 | 37 | MR40 | 30 | 450 |
| Mitsubishi Rayon Co., Ltd. | MR350C-050S | 0.05 | 75 | 25 | MR40 | 30 | 450 |
| Mitsubishi Rayon Co., Ltd. | MR350C-075S | 0.063 | 75 | 25 | MR40 | 30 | 450 |
| Mitsubishi Rayon Co., Ltd. | MRX350C-075R | 0.063 | 75 | 25 | MR40 | 30 | 450 |
| Mitsubishi Rayon Co., Ltd. | MRX350C-100S | 0.085 | 75 | 25 | MR40 | 30 | 450 |
| Mitsubishi Rayon Co., Ltd. | MR350C-100S | 0.085 | 75 | 25 | MR40 | 30 | 450 |
| Mitsubishi Rayon Co., Ltd. | MRX350C-125S | 0.105 | 75 | 25 | MR40 | 30 | 450 |
| Mitsubishi Rayon Co., Ltd. | MR350C-125S | 0.105 | 75 | 25 | MR40 | 30 | 450 |
| Mitsubishi Rayon Co., Ltd. | MR350E-100S | 0.093 | 70 | 30 | MR40 | 30 | 450 |
| Mitsubishi Rayon Co., Ltd. | HRX350C-075S | 0.057 | 75 | 25 | HR40 | 40 | 450 |
| Mitsubishi Rayon Co., Ltd. | HRX350C-110S | 0.082 | 75 | 25 | HR40 | 40 | 450 |

The tensile strength and the tensile elastic modulus are measured in accordance with "Testing Method for Carbon Fibers" JIS R7601: 1986.

EXAMPLES

Hereinafter, the effects of the present disclosure will be clarified by examples. However, the present disclosure should not be interpreted in a limited way based on the description of examples.

Example 1

A shaft was produced in the same manner as described above. A laminated constitution was the laminated constitution shown in FIG. 2. Appropriate prepregs were selected, and specification of the shaft were adjusted by using the above described design methods (a) to (g) to obtain the shaft of Example 1. A prepreg having a sheet thickness of as thin as less than 0.04 mm was used for the hoop layer. The fiber elastic modulus EM1 of the butt partial straight layer s5 was smaller than the fiber elastic modulus EM2 of the tip partial straight layer s9. EM2-EM1 was 6 (ton/mm$^2$). The axial-direction length of the overlap region V1 formed by the layer s5 and the layer s9 was 200 mm. The shaft torque was 7.0 degrees. A driver head made of titanium alloy and a grip were attached to the shaft to obtain a golf club according to Example 1. The specifications and evaluation results of Example 1 are shown in the below Table 3.

Examples 2 to 15 and Comparative Examples 1 and 2

Shafts and golf clubs of Examples 2 to 15 and Comparative Examples 1 and 2 were obtained in the same manner as in Example 1 except that specifications shown in below Tables 3 to 5 were adopted. Specifications and results of evaluations of those are shown in below Tables 3 to 5. Measuring methods for the forward flex f1 and the backward flex f2 were as described above.

TABLE 3

Specifications and results of evaluations for Examples and Comparative Examples

|  | Unit | Ex. 1 | Ex. 2 | Ex. 3 | Ex. 4 | Comp. Ex. 1 |
|---|---|---|---|---|---|---|
| Shaft length | mm | 1150 | 1150 | 1150 | 1150 | 1150 |
| Shaft weight Ws | gram | 42 | 42 | 42 | 42 | 42 |
| Forward flex f1 | mm | 154 | 154 | 154 | 154 | 154 |
| Backward flex f2 | mm | 140 | 140 | 140 | 140 | 140 |
| f2/(f1 + f2) | — | 0.48 | 0.48 | 0.48 | 0.48 | 0.48 |
| Butt end GLL | kg·cm$^2$ | 85 | 101 | 107 | 110 | 118 |
| Presence or absence of overlap region V1 | — | present | present | Present | Present | Present |
| Axial-direction length of overlap region V1 | mm | 200 | 200 | 200 | 200 | 200 |
| Presence or absence of partial hoop layer in overlap region V1 | — | Present | Present | Present | Present | Present |
| Head speed | m/s | 43.5 | 43.3 | 43.2 | 43.2 | 42.7 |
| Variation (σ) in face angle | ° | 1.8 | 2.1 | 2.3 | 2.4 | 2.9 |
| Easiness of swing | Score | 4.4 | 4.3 | 4.2 | 4.2 | 3.7 |

TABLE 4

Specifications and results of evaluations for Examples and Comparative Examples

|  | Unit | Ex. 6 | Ex. 7 | Ex. 8 | Ex. 9 | Ex. 10 | Ex. 11 | Comp. Ex. 2 |
|---|---|---|---|---|---|---|---|---|
| Shaft length | mm | 1150 | 1150 | 1150 | 1150 | 1150 | 1150 | 1150 |
| Shaft weight Ws | gram | 42 | 42 | 42 | 42 | 42 | 42 | 42 |
| Forward flex f1 | mm | 178 | 158 | 154 | 150 | 147 | 130 | 142 |
| Backward flex f2 | mm | 149 | 135 | 140 | 144 | 148 | 132 | 152 |
| f2/(f1 + f2) | — | 0.46 | 0.46 | 0.48 | 0.49 | 0.50 | 0.50 | 0.52 |
| Butt end GLL | kg·cm$^2$ | 105 | 105 | 105 | 105 | 105 | 105 | 105 |
| Presence or absence of overlap region V1 | — | Present | Present | Present | Present | Present | Present | Present |
| Axial-direction length of overlap region V1 | mm | 200 | 200 | 200 | 200 | 200 | 200 | 200 |
| Presence or absence of partial hoop layer in overlap region V1 | — | Present | Present | Present | Present | Present | Present | Present |
| Head speed | m/s | 43.6 | 43.3 | 43.2 | 43.1 | 43.1 | 42.7 | 42.8 |
| Variation (σ) in face angle | ° | 2.8 | 2.1 | 2.3 | 2.6 | 2.7 | 2.3 | 3.2 |
| Easiness of swing | score | 4.0 | 4.4 | 4.3 | 4.2 | 4.1 | 4.1 | 3.7 |

TABLE 5

Specifications and results of evaluations for Examples and Comparative Examples

|  | Unit | Ex. 12 | Ex. 13 | Ex. 14 | Ex. 8 | Ex. 15 |
|---|---|---|---|---|---|---|
| Shaft length | mm | 1150 | 1150 | 1150 | 1150 | 1150 |
| Shaft weight Ws | gram | 42 | 42 | 42 | 42 | 42 |
| Forward flex f1 | mm | 154 | 154 | 154 | 154 | 154 |

TABLE 5-continued

Specifications and results of evaluations for Examples and Comparative Examples

| | Unit | Ex. 12 | Ex. 13 | Ex. 14 | Ex. 8 | Ex. 15 |
|---|---|---|---|---|---|---|
| Backward flex f2 | mm | 140 | 140 | 140 | 140 | 140 |
| f2/(f1 + f2) | — | 0.48 | 0.48 | 0.48 | 0.48 | 0.48 |
| Butt end GLL | kg · cm$^2$ | 105 | 105 | 105 | 105 | 105 |
| Presence or absence of overlap region V1 | — | Absent | Present | Present | Present | Present |
| Axial-direction length of overlap region V1 | mm | — | 50 | 100 | 200 | 200 |
| Presence or absence of partial hoop layer in overlap region V1 | — | — | Present | Present | Present | Absent |
| Head speed | m/s | 42.6 | 43.1 | 43.2 | 43.2 | 42.7 |
| Variation (σ) in face angle | ° | 2.6 | 2.4 | 2.3 | 2.3 | 2.4 |
| Easiness of swing | score | 3.9 | 4.1 | 4.2 | 4.3 | 4.0 |

[Evaluation Methods]

The evaluation methods are as follows.

[Head Speed]

Ten testers having a handicap of 0 to 20 performed ball-hitting tests. Each of the testers hit five balls with each of the clubs. A head speed was measured for each of the shots. The average values of the 50 data are shown in the above Tables 3 to 5.

[Easiness of Swing]

As for easiness of swing of each club, sensuous evaluation was made by the ten testers. The evaluation was made on a scale of one to five. The higher the score is, the higher the evaluation is. The average scores of the ten testers are shown in the above Tables 3 to 5.

[Variation in Face Angle]

Ball-hitting tests were performed by the ten testers. Each of the testers hit five balls with each of the clubs. A face angle at impact was measured for each of the shots. The average values of standard deviations σ of the five shots each by the 10 testers are shown in the above Tables 3 to 5.

As shown in the results of evaluations, the advantages of the present disclosure are apparent.

The shaft according to the present disclosure can be applied to all golf clubs such as a wood type golf club, a utility type (hybrid type) golf club, and an iron type golf club.

The description hereinabove is merely for an illustrative example, and various modifications can be made in the scope not to depart from the principles of the present disclosure.

What is claimed is:

1. A golf club shaft, comprising:
    a plurality of layers,
    wherein a forward flex is equal to or longer than 130 mm and equal to or shorter than 178 mm,
    wherein the forward flex is represented by f1, a backward flex is represented by f2, and f2/(f1+f2) is equal to or greater than 0.46 and equal to or less than 0.50,
    wherein a distance between a butt end and a center of gravity of the shaft is represented by L (centimeter), a weight of the shaft is represented by Ws (kilogram), and a butt end GLL calculated by the following formula is equal to or less than 110 kg·cm$^2$:

butt end $GLL = Ws \times L \times L$, wherein the plurality of layers include a butt partial straight layer and a tip partial straight layer, and
    wherein an overlap region in which the butt partial straight layer and the tip partial straight layer overlap each other in an axial-direction region is formed.

2. The golf club shaft according to claim 1, wherein the butt partial straight layer has a fiber elastic modulus of smaller than a fiber elastic modulus of the tip partial straight layer.

3. The golf club shaft according to claim 1 further comprising a partial hoop layer, wherein the partial hoop layer is disposed in the overlap region.

4. The golf club shaft according to claim 3, wherein the partial hoop layer is a middle partial hoop layer.

5. The golf club shaft according to claim 1, wherein
    the golf club shaft is divided into a tip region, a middle region, and a butt region by dividing the golf club shaft into three equal parts in an axial direction, and
    the whole of the overlap region is included in the middle region.

6. The golf club shaft according to claim 1, wherein the overlap region has an axial-direction length of equal to or longer than 50 mm and equal to or shorter than 400 mm.

7. The golf club shaft according to claim 2, wherein a difference between the fiber elastic modulus of the tip partial straight layer and the fiber elastic modulus of the butt partial straight layer is equal to or greater than 5 (t/mm$^2$) and equal to or less than 22 (t/mm$^2$).

8. The golf club shaft according to claim 1, wherein the butt end GLL is equal to or greater than 85 kg·cm$^2$.

9. The golf club shaft according to claim 1, wherein the golf club shaft includes a shaft length of equal to or longer than 43 inches and equal to or shorter than 48 inches.

10. The golf club shaft according to claim 1, wherein the golf club shaft includes:
    a shaft weight of equal to or greater than 35 g and equal to or less than 50 g; and
    a shaft torque of equal to or greater than 6.0 degrees and equal to or less than 7.5 degrees.

11. A golf club shaft according to claim 1, wherein the plurality of layers further includes a first butt partial layer and a second butt partial layer,
    wherein the first butt partial layer is a glass fiber reinforced layer, and
    wherein the second butt partial layer is a hoop layer.

12. The golf club shaft according to claim 11, wherein all of the layers other than the first butt partial layer are carbon fiber reinforced layers.

13. The golf club shaft according to claim 11, wherein the first butt partial layer is a straight layer.

14. The golf club shaft according to claim 11, wherein the second butt partial layer is a carbon fiber reinforced layer.

15. The golf club shaft according to claim 11, wherein the first butt partial layer has an axial-direction length of equal to or longer than 100 mm and equal to or shorter than 350 mm.

16. The golf club shaft according to claim 11, wherein the second butt partial layer has an axial-direction length of equal to or longer than 100 mm and equal to or shorter than 400 mm.

* * * * *